US008844812B1

(12) United States Patent
Rivera et al.

(10) Patent No.: US 8,844,812 B1
(45) Date of Patent: Sep. 30, 2014

(54) POINT-OF-SALE TOKEN SCANNER AND RELATED METHODS

(71) Applicants: Steve Rivera, Brookline, MA (US); John Jannetty, Quincy, MA (US); Jonathan Fisher, Somerville, MA (US); Harald Prokop, Cambridge, MA (US); Seth Priebatsch, Boston, MA (US)

(72) Inventors: Steve Rivera, Brookline, MA (US); John Jannetty, Quincy, MA (US); Jonathan Fisher, Somerville, MA (US); Harald Prokop, Cambridge, MA (US); Seth Priebatsch, Boston, MA (US)

(73) Assignee: Scvngr, Inc., Boston, MA (US)

(*) Notice: Subject to any disclaimer, the term of this patent is extended or adjusted under 35 U.S.C. 154(b) by 0 days.

(21) Appl. No.: 14/022,480

(22) Filed: Sep. 10, 2013

Related U.S. Application Data

(60) Provisional application No. 61/784,951, filed on Mar. 14, 2013.

(51) Int. Cl.
*G06K 15/00* (2006.01)
*G06K 7/01* (2006.01)

(52) U.S. Cl.
CPC .................................. *G06K 7/01* (2013.01)
USPC .......................... 235/383; 235/375; 235/455

(58) Field of Classification Search
CPC ..... G06Q 20/04; G06Q 20/401; G06Q 20/00; G06Q 20/4012; G06Q 20/4014; G06Q 20/388; G06Q 20/40975; G06Q 20/18; G06Q 20/42; G06Q 20/425; G06Q 20/3278; H04L 2209/56; H04L 9/08
USPC .......... 235/379, 451, 462.01, 472.01–472.03, 235/492, 493, 380–383, 375, 385
See application file for complete search history.

(56) References Cited

U.S. PATENT DOCUMENTS

| | | | |
|---|---|---|---|
| 4,670,644 A * | 6/1987 | Grayson | 235/487 |
| 2001/0015377 A1 * | 8/2001 | Vassura et al. | 235/454 |
| 2002/0070279 A1 * | 6/2002 | Zausner | 235/490 |
| 2003/0047598 A1 * | 3/2003 | Stahl et al. | 235/380 |
| 2006/0278698 A1 * | 12/2006 | Lovett | 235/380 |
| 2008/0055074 A1 * | 3/2008 | Gao et al. | 340/539.13 |
| 2008/0110977 A1 * | 5/2008 | Bonalle et al. | 235/380 |
| 2008/0210754 A1 * | 9/2008 | Lovett | 235/380 |
| 2011/0139869 A1 * | 6/2011 | Bonalle et al. | 235/380 |

* cited by examiner

Primary Examiner — Tuyen K Vo
(74) Attorney, Agent, or Firm — Bingham McCutchen LLP (57) ABSTRACT

A scanning device provides illumination with a stand-by color in a stand-by mode and a user color upon approval of payment transactions.

22 Claims, 7 Drawing Sheets

POINT-OF-SALE TOKEN SCANNER AND RELATED METHODS

CROSS-REFERENCE TO RELATED APPLICATIONS

This application claims priority to and the benefit of, and incorporates herein by reference in its entirety, U.S. Provisional Patent Application No. 61/784,951, which was filed on Mar. 14, 2013.

FIELD OF THE INVENTION

The present invention relates, in general, to scanners, and in particular to scanners that facilitate transactions at a point of sale.

BACKGROUND

A growing proportion of consumer transactions now utilize electronic payment modalities rather than cash. Completion of a transaction typically requires the physical presence of the consumer, who may be asked to authenticate himself, present a physical token and/or provide a signature to a merchant or bank. Credit cards (which represent a type of physical token) have been accepted and validated electronically for many years. Many merchants now have readers for credit and debit cards at each point-of-sale (POS) terminal, so that customers can swipe their own cards and complete transactions. The reader acquires the information encoded on the magnetic strip of the card and transmits this to a payment processor, which upon approval of the card returns an authorization code that enables the merchant to complete the transaction. This information exchange generally occurs over standard telecommunication infrastructures.

Widespread usage of computationally advanced mobile telecommunication devices increases the range of modalities available for completing electronic transactions. A mobile phone, for example, may utilize its own ability to communicate securely via the telecommunications infrastructure with a payment processor so as to obviate the need for remote communication by a POS reader. In these arrangements the customer, rather than the merchant, communicates with the payment processor, which approves the transaction by sending an electronic message to the phone. The phone, in turn, uses the message to generate a token that may be read by the merchant's POS system—either optically (e.g., as a QR code) or as a wireless signal (e.g., by means of near-field communication or NFC). A form of public-key encryption may be used so that the merchant's reader need not itself communicate with a remote system; its ability to successfully decrypt the token it has read suffices to validate the transaction. This form of electronic payment is sometimes called "m-payment" (connoting a "mobile payment" using a mobile communication device). In other m-payment schemes, the mobile phone generates a token identifying the user and specifying a payment processor, and the POS scanner communicates with the specified payment processor as it would for a credit or debit card.

Thus, the merchant may have a swipe reader for reading credit and debit cards and a separate scanner for NFC or optical tokens supporting m-payments. Acclimating both merchants and customers these different types of payment systems, and supporting them with appropriate readers, will require continued investment. The experience of swiping a card, for example, can differ from transacting an m-payment. A credit-card customer instantly knows when her swiped credit card has been read, but an m-payment customer may hold his phone near the POS scanner not knowing when the token will arrive, whether the scanner has sensed it, and when it has approved the transaction. Improving the interactivity of the m-payment transaction experience will accelerate mainstream acceptance of these new modes of payment.

SUMMARY

In various embodiments, the present invention provides a token-scanning device for facilitating processing of transactions, typically initiated by a consumer at a point of sale. Scanning devices in accordance with the invention provide visual cues to customers identifying the nature of the device and indicating when transaction approval has occurred.

As used herein, the term "token" means any medium for storing information that facilitates processing and completion of a transaction. A token may be simple identifying information, such as the contents of a magnetic strip on a credit card; may be one or more data elements encrypted in a way that guarantees authenticity or a source when decrypted by a particular key or a key obtained from a particular source; may be a wireless signal provided by, for example, NFC to a reader; or may be a visual symbol, such as a QR code, that encodes information about a user and/or evidence of a transaction approval by a payment processor. The term "scan" broadly connotes acquiring a token, by contact (as with a swipe reader), by wireless radio communication (as with NFC) or by optical recognition and decoding (as with QR codes).

A token-scanning device in accordance with the invention may include a housing and reader circuitry appropriate to the type(s) of token(s) readable by the device. The device typically also includes an approval module for authorizing a transaction. This may, in some implementations, involve communication with a remote server (e.g., maintained by a payment processor), e.g., the scanner may transmit a token it has read from a user's card or mobile device and await a transaction approval code from the server. In other implementations, the user's device has already communicated with the remote server and received an approval code, which is transformed into the token read by the scanning device and recognized as legitimate by the approval module. Importantly, the scanning device provides illumination that is both distinctive in identifying the device and responsive to transaction approval. In a stand-by mode—i.e., the default mode assumed by the device between transactions even during a transaction until approval occurs—the device may, in some embodiments, display illumination such that light of a characteristic color (e.g., associated with a brand) appears to be emanating from portions the device. The light may "breathe," i.e., rhythmically vary in intensity, in order to enhance the visual cue.

Once a transaction has been approved, the illumination may change to a different color, such as one selected in advance by the user, at a constant intensity that may be higher than the peak intensity of the stand-by mode. In another embodiment, the scanning device changes illumination upon detecting the presence of the token. The illumination may be integral with the housing, i.e., embedded or arranged to use portions of the housing as a waveguide so that those housing portions appear to glow. For example, the housing may have a base portion that supports a canted scanner unit. The base portion may receive light from one or more point sources (e.g., embedded light-emitted diodes (LEDs)) and emit this light uniformly from one or more faces. The scanner unit may be surrounded by one or more light rings, i.e., waveguides that receive light from one or more point sources and emit this light uniformly from the outer ring surface.

Accordingly, in one aspect, the invention pertains to an apparatus for obtaining token information with a visible response. In various embodiments, the apparatus includes a housing, reader circuitry for wirelessly obtaining information encoded on a token, an approval module, integral with the housing, one or more illumination devices for providing illumination from the housing, and driver circuitry for causing the one or more illumination devices to illuminate (i) during normal operation in a stand-by color and (ii) upon approval by the approval module of a transaction based on the token, in a user color, wherein the user color is associated with the token and is different from the stand-by color.

The approval module may include transceiver circuitry for (i) transmitting the obtained information to a data center and (ii) receiving approval information from the data center. The user color may be identified by the information encoded on the token and/or the approval information received by the transceiver circuitry. In addition, the approval module may be configured to approve the token upon successful decryption thereof. In some embodiments, the driver circuitry causes the one or more illumination devices to output the user color at a higher luminous intensity than the stand-by color.

In various embodiments, the apparatus further includes a memory, coupled to the driver circuitry, for storing an entered code specifying the stand-by color. The driver circuitry may be configured to drive the one or more illumination devices to output the stand-by color at a luminous intensity that varies rhythmically; and drive the one or more illumination devices to output the user color without luminous intensity variation. Additionally, the reader circuitry may include an optical sensor and/or a near-field communication sensor. The illumination device(s) may include a light ring surrounding one or more portions of the housing.

In another aspect, the invention relates to a method for obtaining token information with a visible response using a scanner device having a housing. In various embodiments, the method includes the steps of: in a stand-by mode, providing illumination from the housing in a stand-by color; wirelessly obtaining, by the scanner device, information encoded on a token; approving a transaction based on the token; and transitioning to an approval mode whereby the provided illumination changes to a user color, the user color being associated with the token and being different from the stand-by color. In one implementation, the method further includes the steps of: transmitting, by the scanner device, the obtained information to a data center; and receiving, by the scanner device, approval information from the data center. Illumination in the stand-by mode may have a lower luminous intensity than illumination in the user color. In addition, the user color may be identified by the approval information or the information encoded on the token.

In some embodiments, the method includes the steps of: (i) receiving and storing a color code, and (ii) in the stand-by mode, causing the provided illumination to correspond to the stored color code. In one embodiment, the method further includes the steps of: in the stand-by mode, rhythmically increasing and decreasing at a luminous intensity of the stand-by color; and in the approval mode, outputting the user color without luminous intensity variation.

The information encoded on the token may be obtained optically, by near-field communication and/or by swiping a card through the housing. In addition, one or more portions of the provided illumination are output from a light ring surrounding one or more portions of the housing.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
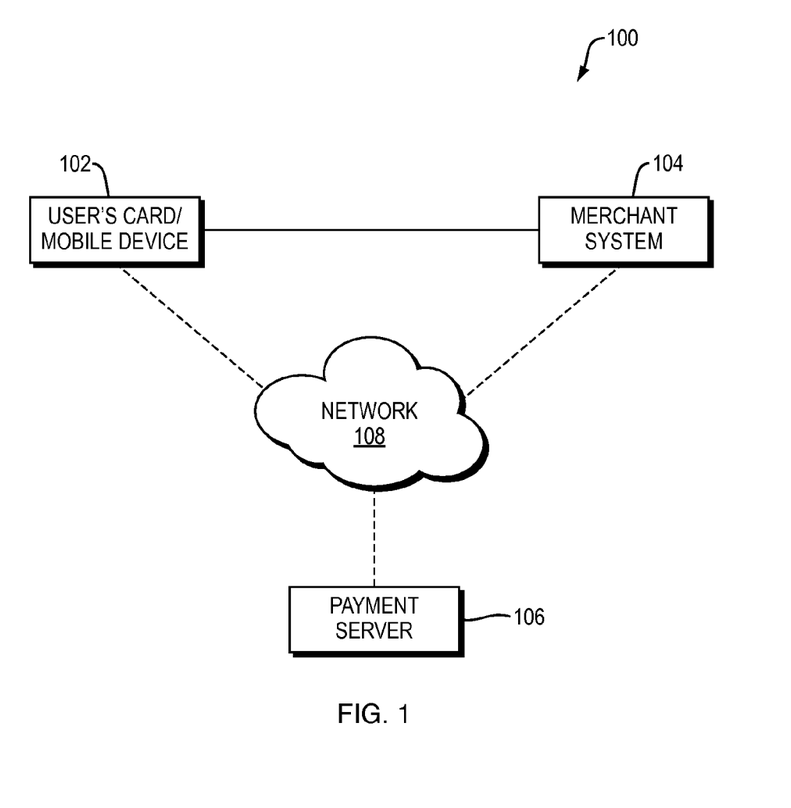
FIG. 1 is a block diagram of an exemplary transaction network in accordance with an embodiment of the invention.

Refer first to FIG. 1, an exemplary m-payment transaction system 100 includes a user's card or mobile device 102, a merchant system 104 associated with a merchant who offers goods or services for sale to the user, and a payment server or data center 106 facilitating processing of payment transactions. In one embodiment, the user possesses a card (e.g., a credit or debit card) 102 that can be read by the merchant system 104 (e.g., using a magnetic-strip-card reader). The merchant system 104 then encodes the information from the card and transmits it to the payment server 106 via a network 108 that supports wired, wireless, or any two-way communication (e.g., a cellular telephone network, the Internet, or any wide-area network or combination of networks capable of supporting point-to-point data transfer and communication). The payment server 106, operated by a payment-processing entity, is then responsible for authenticating and actually performing the payment transaction. For example, a so-called "direct" payment processor represents the financial-processing backend provider for credit-card issuers and payment services such as PAYPAL. An "indirect" payment processor is an independent entity processing transactions for multiple payment services and maintains its own records and data. In another embodiment, the user utilizes a mobile device 102 to facilitate the payment transactions. The mobile device 102 communicates with the merchant system 104 using, for example, wireless radio communication (e.g., NFC) or optical recognition (e.g., when QR codes are presented). Again, upon receiving the information from the mobile device 102, the merchant system 104 encodes and transmits the information to the payment server 106 via the network 108 for payment authentication. Alternatively, the mobile device 102 may directly communicate with the remote payment server 106 and receive a code or a token (hereafter referred to generically as a "token") approving or denying the transaction via the network 108. The received approval/denial token may then be decrypted and/or recognized by the merchant system 104. The merchant system 104 subsequently accepts or rejects the payment transaction based on the decrypted and/or recognized data. As used herein, the term "mobile device" broadly connotes any card or device that communicates with the merchant system 104 via a radio-frequency signal, a near-field-communication signal, a Bluetooth signal, an audio signal, and/or an optical signal.

Figure 2:
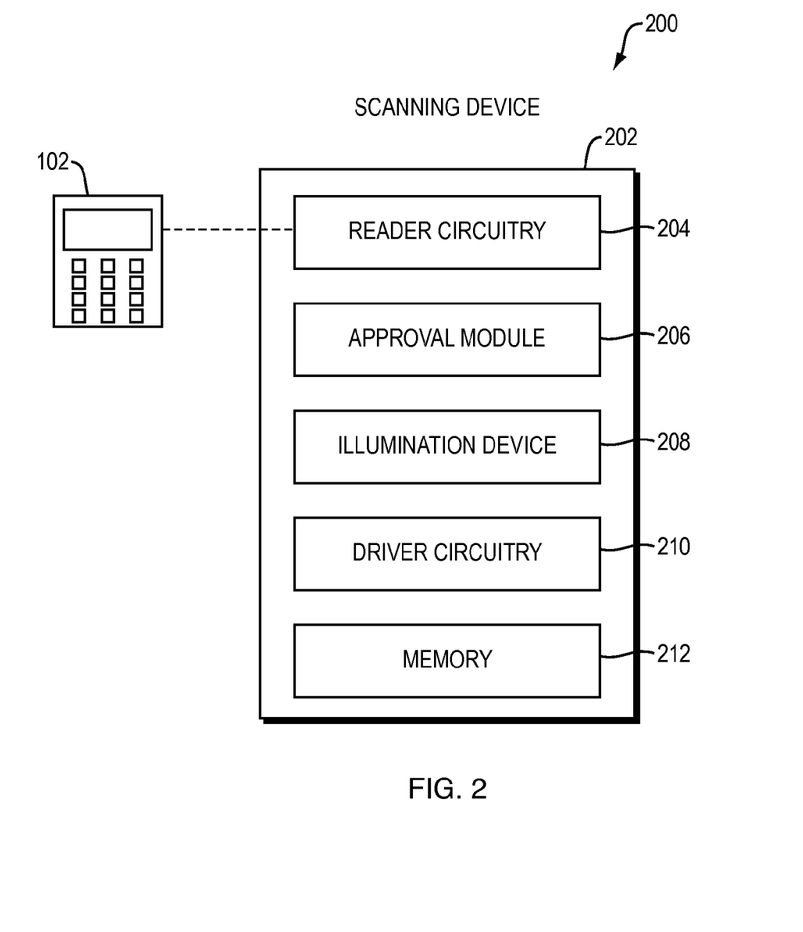
FIG. 2 is a block diagram of an exemplary scanning device in accordance with an embodiment of the invention.

In various embodiments, the merchant system 104 includes a scanning device 200 to obtain information provided by the user's mobile device 102. The scanning device 200 interfaces with POS terminals using, for example, Bluetooth or universal serial bus (USB) communications. Referring to FIG. 2, the scanning device 200 includes a housing 202 that encloses conventional reader circuitry 204, which is capable of reading and/or decoding information encoded on various types of tokens (e.g., a barcode, a radiofrequency identification (RFID) code, a QR code, NFC signals, audio signals, or infrared signals) presented by the mobile device 102. Also within the housing 202 are an approval module 206 for authorizing a payment transaction, one or more illumination devices 208 for providing illumination from the housing 202, and driver circuitry 210 for facilitating operations of the illumination device 208. In addition, the housing 202 may enclose a memory 212 in operative communication with the driver circuitry 210; the memory may store, among other things, data relevant to parameters for operating the illumination device 208 (e.g., luminous color or intensity). In one embodiment, the housing 202 is made of lightweight but strong material such as a hard plastic or metal. The housing 202 may have rounded edges for decorative purposes and avoidance of injuries.

Figure 3A:
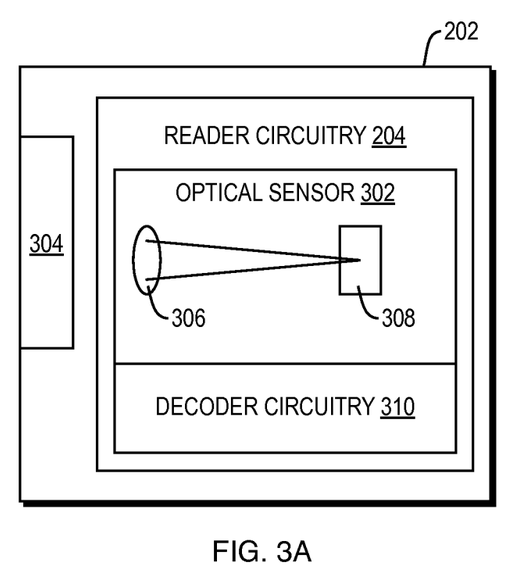
FIGS. 3A, 3B, and 3C are block diagrams of exemplary reader circuitry implemented in the scanning device in accordance with various embodiments of the present invention.
Figure 3B:
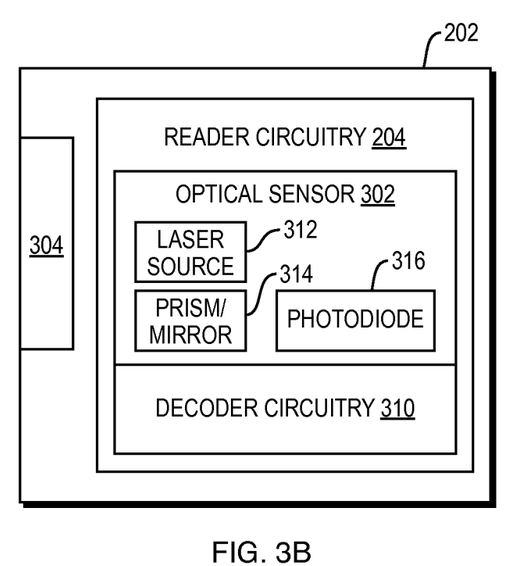

Referring to FIG. 3A, in various embodiments, the reader circuitry 204 includes an optical sensor 302 to capture token image data (such as a bar code or a QR code) through, for example, a window 304 in the housing 202. The term "optical sensor" herein generally refers to any device (or combination of devices) capable of capturing an image of the token and representing that image in the form of digital data. For example, the optical sensor 302 may include a lens 306 that projects an image of the token onto the image sensor 308 located at the focal plane of the lens 306. The lens 306 may have any suitable focal length (e.g., approximately 10 centimeters) and depth of field (e.g., approximately 20 centimeters). The image sensor 308 may have an array of light-sensitive picture elements (pixels) having various wavelength sensitivities or intensity resolution (e.g., numbers of bits of intensity data per pixel). During operation, the acquired token image is formed as light strikes the pixels with varying intensity. Each pixel of the image sensor 308 converts the light into an electric charge proportional to the intensity of the detected light. In one embodiment, the optical sensor 304 utilizes a charge-coupled device (CCD) sensor; the electric charge associated with each pixel is transported to a single structure that converts the charge into a measurable voltage. In another embodiment, the optical sensor 304 uses a complementary metal-oxide-semiconductor (CMOS) sensor that places a measurement structure at each pixel location. The measurement structures convert light to measurable voltages, which are sampled and digitized as digital data. The digital data can be then processed by decoder circuitry 310, which extracts the information encoded therein. Referring to FIG. 3B, alternatively, the optical sensor 302 may include a laser source (such as a solid state laser including a diode laser) 312, a rotating prism or a reciprocating minor 314, and a photodiode 316. During scanning, a laser beam is emitted towards the presented token image and the rotating prism or the reciprocating minor 314 scans the laser beam back and forth across the image. Because dark portions on the token absorb the laser light while white portions reflect the laser light, the intensity of the light reflected from the token image can be converted to a measurable voltage by the photodiode 316 and further digitized as digital data. Again, the digital data can then be transmitted to the decoder circuitry 310 for decrypting the information encoded therein.

Figure 3C:
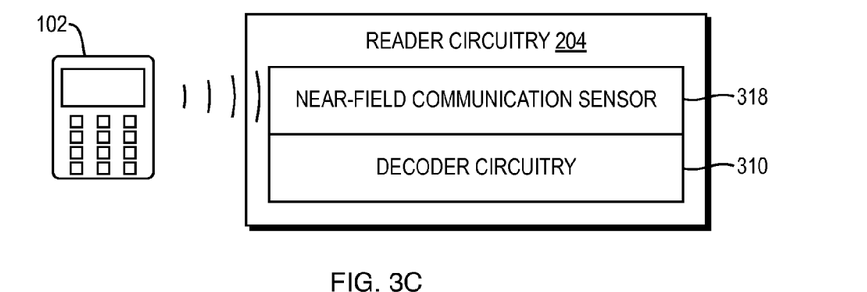

Referring to FIG. 3C, in some embodiments, the reader circuitry 204 includes a near-field communication (NFC) sensor 318 that can establish radio communication with the user's mobile device in close proximity (e.g., within 10 centimeters). To initiate payment transactions, the user brings her mobile device 102 containing the token within a short-distance RF activation range detectable by the NFC sensor 318. The NFC sensor 318 reads the data associated with the token and then passes it to the decoder circuitry 310 for decrypting the encoded information. Because the size of the NFC sensor is compact, it can be easily incorporated in the scanning device 200. Additionally, utilization of the NFC sensor advantageously consumes little power and eliminates data confusion during multiple signal transactions (because of its short activation distance).

Figure 4:
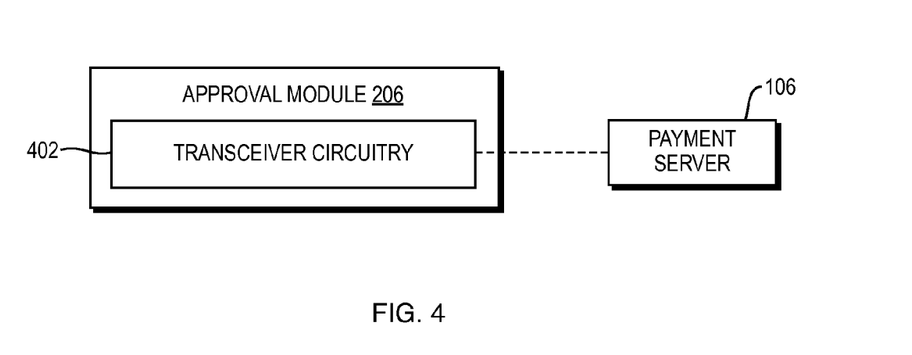
FIG. 4 is a block diagram of an exemplary approval module implemented in the scanning device in accordance with an embodiment of the invention.

Data extracted from the decoder circuitry 310 may be transmitted to the approval module 206 for authorization. Referring to FIG. 4, in one embodiment, upon receiving the decoded data, the approval module 206 first determines whether the data includes a payment authentication; if not, the approval module 206 utilizes transceiver circuitry 402 to pass the data (with or without encryption) to the remote payment server 106 and receive a transaction approval or denial code therefrom. The approval module 206 then approves or denies the payment transaction accordingly. The transceiver circuitry 402 may include, for example, a communication module having a conventional component (e.g., a network interface or transceiver) designed to provide communications with a network, such as the Internet and/or any other land-based or wireless telecommunications network or system, and, through the network, communicating with the payment server 106. Additionally, the approval module 206 may generate signals associated with the transaction approval or denial code, which are then transmitted to the driver circuitry 210 for facilitating operations of the illumination device 208 as further described below. In another embodiment, the data decoded by the reader circuitry 204 includes the transaction approval or denial code that has been transmitted to the user's device 102 prior to the reading and decoding processes. Upon receiving the transaction approval or denial code from the reader circuitry 204, the approval module 206 identifies the legitimacy thereof (e.g., by decryption using PKI) and approves or denies the payment transaction based thereon. Again, the approval module 206 subsequently generates and transmits signals associated with the approval or denial code to the driver circuitry 210 for regulating the illumination device 208.

Figure 5:
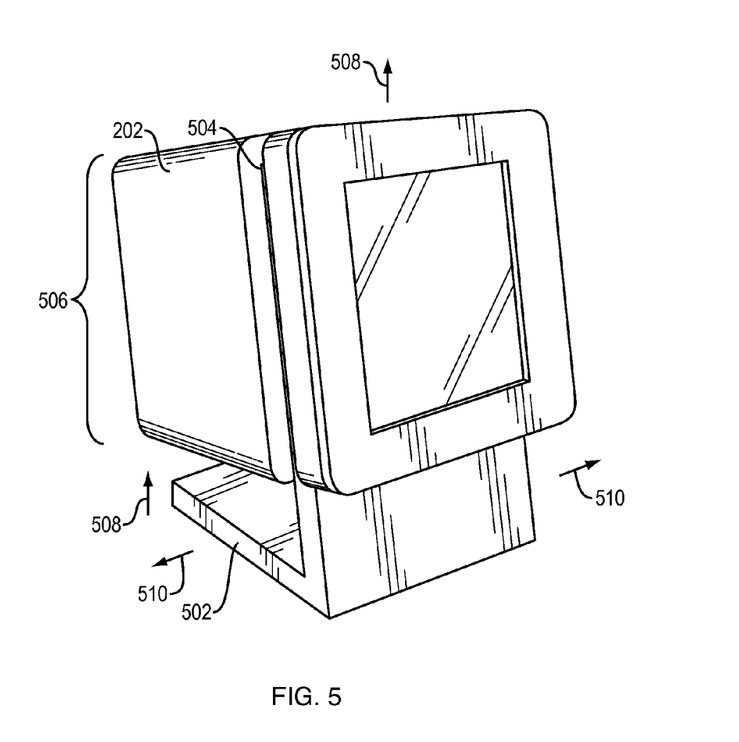
FIG. 5 is an exemplary scanning device in accordance with an embodiment of the present invention.
Figure 6:
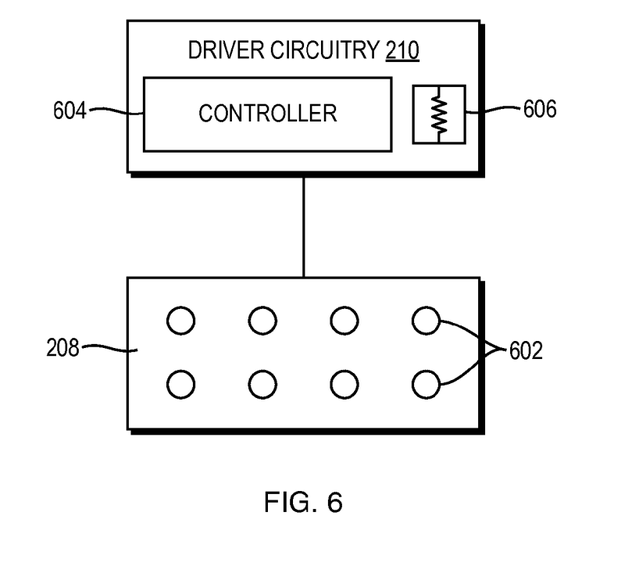
FIG. 6 is a block diagram of exemplary driver circuitry implemented in the scanning device in accordance with an embodiment of the invention.

The illumination device 208 may be integrated with the housing 202, i.e., embedded within or arranged with respect to portions of the housing 202 so that portions of the housing appear to glow. Referring to FIG. 5A, in one embodiment, the illumination device 208 is integrated with a base portion 502 that emits light uniformly from one or more faces thereof. For example, the base portion 502 may be a waveguide that retains light by total internal reflection except at an output face, where light is scattered so as to be emitted therefrom. Alternatively, the illumination device 208 may be embedded in (or may direct light into) one or more light rings 504 surrounding at least a portion (e.g., the periphery) of the housing 202. The light rings 504 may be waveguides that receive light from one or more point sources and re-emit this light uniformly from the outer ring surface. If desired, light may be emitted from both the base portion 502 and the light rings 504, and/or from any other surface or surface feature of the housing 202, so that illumination is provided from multiple regions of the housing 202 in accordance with design requirements. The base portion 502 and/or the light rings 504 may be made of transparent or semi-transparent materials (e.g., a waveguide material such as polymethyl methacrylate) to allow light transmitted therethrough. The base portion 502 supports the scanner body 506 which, in the illustrated embodiment, is canted with respect to the base portion; in one embodiment, the base portion 502 includes a mechanism (e.g., a joint or a hinge) to allow the degree of tilt to be altered, and in some implementations to provide other degrees of freedom (e.g., rotation) for positional adjustment of the scanner body 506. This advantageously enables the reader circuitry 204 in the scanning device 200 to capture the token information within a broad angular range and to accommodate space constraints that merchants may have. Additionally, light emitted from the base portion 502 and light channel 504 may be directional. For example, the emitted illumination from the base portion 502 and the light rings 504 may be mainly in the upward and side directions 508, 510 of the scanning device 200; this limits unnecessary light transmitted to the user's device, thereby reducing light interference in the scanning or token-reading process.

In various embodiments, the illumination device 208 includes one or more light-emitting diodes (LEDs). Because each LED emits light at a specific wavelength or wavelength range (thereby emitting a specific color), the term "LED" as used herein should be understood to refer to one or more LEDs that emit the same color, while the term "multiple LEDs" refers to LEDs that emit different colors. In one embodiment, the illumination device 208 includes multiple LEDs, such as at least one each of red-, green-, and blue-emitting LEDs. The emitted illumination therefore may be a single color of the red, green and blue light (if only a single type of LED is active) or a mixture of any combination thereof. For example, substantially white light may be derived from a combination of the three different light colors. In another embodiment, the illumination device 208 includes single-colored LEDs; each LED is surrounded with one or more fluorescent or phosphorescent materials, such as a phosphor, fluorescent dye, photo-luminescent semiconductor or quantum dots (herein referred to, collectively, as a phosphor). Various colors can be obtained by activating/deactivating various LEDs surrounded by different phosphors.

Referring to FIG. 5, in various embodiments, the LED(s) is/are operated by the driver circuitry 210. For example, the driver circuitry 210 may vary current passing through the LED(s) 602 and/or alter the duration of the LED(s) operation. Similarly, the driver circuitry 210 may adjust the luminous output levels of differently colored LEDs to establish a color-mixed output (which may vary over time) corresponding to the desired color. This may be implemented by changing the current level through each of the differently colored LEDs or the illumination times of the LEDs.

The luminous output may provide visual cues that identify the device in the manner of a trademark and indicate when transaction approval/denial has occurred. For example, the scanning device 200 may provide time-varying illumination (e.g., time-varying luminous intensity or color) from the base portion 502 and/or light ring(s) 504 of the device in a stand-by mode (i.e., when no transaction is being processed). The stand-by mode is typically set as a default mode assumed by the device between transactions. In some embodiments, the stand-by mode persists even during a transaction until the transaction token is detected and/or transaction approval occurs. Time-varying illumination may be provided by a modulated drive signal, e.g., a pulse-width modulation (PWM) signal outputted from, for example, a controller 604 in the driver circuitry 210. Depending on the LED and circuit configuration, either the voltage or the current can be varied. For example, the luminous intensity of the illumination device 208 may be regulated via varying the duration (i.e., the duty cycle) of the LED(s) (by switching the LED(s) on and off) based on the pulse width and/or frequency of the PWM signal. In general, the longer the "on" periods are relative to the "off" periods, the brighter the LED(s) appear to the observer. PWM signals may be used to gradually brighten and dim the LED(s) by increasing and decreasing the duty cycle over time. PWM signals with different patterns of duty-cycle variation can be applied to differently colored LEDs so that the overall color mixture of LEDs light varies with time. The scanning device 200 therefore provides light that may "breathe," i.e., rhythmically vary in intensity and/or color, in order to enhance the visual cue observed by the users.

In some embodiments, the rhythmically time-varying illumination of the scanning device 200 continues until a transaction token is presented by the user and/or the transaction token is decoded and verified and the transaction is completed (i.e., either approved or denied). The scanning device 200 then provides illumination that is both distinctive in identifying the device and responsive to the presence of the token and/or transaction approval/denial. For example, when the driver circuitry 210 receives signals that indicate the transaction has been approved (i.e., enters an approval mode), the controller 604 may first stop the time-varying illumination and then activate a specific colored LED, which is different from any one of the colors illuminated in the stand-by mode, at a constant intensity that may be higher than the peak intensity of the stand-by mode. Alternatively, the controller 604 may cause the LED(s) 602 to emit light having a different luminous intensity than that of the time-varying illumination in a stand-by mode without changing the color. Similarly, if the transmitted signal indicates that the payment transaction has been denied, the controller 604 may stop the time-varying illumination and cease all illumination or activate another LED(s) having a third color and/or intensity, different from the colors and/or intensities in the stand-by mode and the approval mode. Importantly, the scanning device 200 provides illumination that can distinctively indicate the transaction result as well as identify the device's response to the result. In another embodiment, illumination of the scanning device 200 changes upon detecting the presence of the token.

The user may register one or more preferred lighting parameters (e.g., a color and/or an intensity) to her account prior to initiating payment transactions. In one embodiment, when the payment server 106 verifies the user's identity and account, the registered lighting parameters are transmitted along with the transaction approval/denial code to the approval module 206 via the transceiver circuitry 402. Signals representative of an approved/denied transaction and the user-registered lighting parameter(s) are provided to the driver circuitry 210, which responsively drives the scanning device 200 in accordanced therewith. For example, the controller 604 may first determine that the transaction has been approved, then identify the user-specific lighting parameter (e.g., high-intensity green light) associated with an approved transaction. The controller 604 thereupon causes the driver circuitry 210 to modulate the LED(s) to emit high-intensity green light. In another embodiment, the user's choice of lighting parameter(s) is encoded on the token presented by the user and decoded by the decoder circuitry 301 of the scanning device 200 as described above. In still other embodiments, the lighting parameter(s) may be stored in a user database in the memory 212; this information can be retrieved at a later time when the user is identified.

Once the payment transaction has been completed, the driver circuitry 210 may switch to the stand-by mode, which, again, provides rhythmically time-varying illumination until the next transaction starts. Because each user may select a different color and/or intensity, the user-specific illumination avoids confusions between successive transactions of multiple users.

Figure 7:
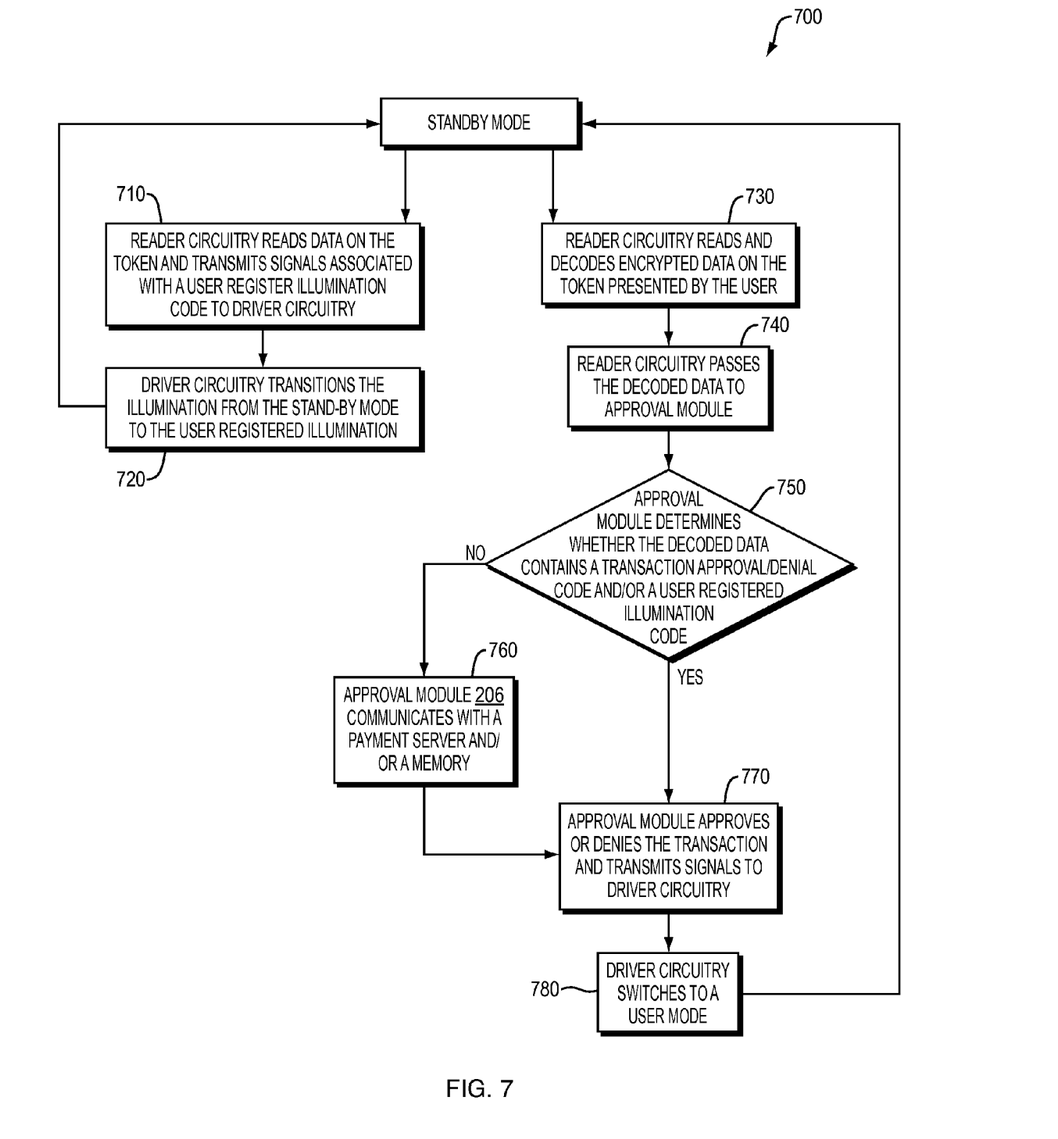
FIG. 7 is a flow chart illustrating performance of the scanning device in accordance with an embodiment of the invention.

A representative method 700 for providing users with a visible cue for payment transactions in accordance with embodiments of the current invention is shown in FIG. 7. In a stand-by mode, the scanning device 200 provides rhythmically time-varying illumination. In a first step 710, when a user presents a token to the scanning device 200, reader circuitry 204 implemented therein reads data on the token and transmits signals associated with a user register illumination code to driver circuitry 210. In a second step 720, the driver circuitry 210 transitions the illumination from the stand-by mode to the user registered illumination. Alternatively, the reader circuitry 204 reads and decodes encrypted data on the token (in a third step 730). In a fourth step 740, the reader circuitry 204 passes the decoded data to the approval module 206. The approval module 206 then determines whether the decoded data contains a transaction approval/denial code and/or a user-registered illumination code (in a fifth step 750). If not, the approval module 206 communicates with a payment server 106 and/or a memory 210 for obtaining such information (in a sixth step 760). In a seventh step 770, the approval module 206 approves or denies the transaction and transmits indication signals and signals associated with the user registered illumination code to driver circuitry 210. The driver circuitry 210 then transitions the illumination from the stand-by mode to the mode specified by the transaction result and the user's registered lighting preferences (in a eighth step 780). After a completion of the transaction, the scanning device 200 switches back to the stand-by mode, which, again, provides rhythmically time-varying illumination until the beginning of the next transaction.

The controller 604 in the driver circuitry 210 may be provided as either software, hardware, or some combination thereof. For example, the system may be implemented on one or more server-class computers, such as a PC having a CPU board containing one or more processors such as the CORE PENTIUM or CELERON family of processors manufactured by Intel Corporation of Santa Clara, Calif. and POWER PC family of processors manufactured by Motorola Corporation of Schaumburg, Ill., and/or the ATHLON line of processors manufactured by Advanced Micro Devices, Inc., of Sunnyvale, Calif. The controller 604 may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), or programmable logic devices (PLD). In some embodiments, the programs are provided using external RAM and/or ROM such as optical disks, magnetic disks, as well as other commonly used storage devices.

For embodiments in which the controller 604 is provided as a software program, the program may be written in any one of a number of high level languages such as FORTRAN, PASCAL, JAVA, C, C++, C#, LISP, PERL, BASIC, PYTHON or any suitable programming language. Additionally, the software can be implemented in an assembly language and/or machine language directed to the microprocessor resident on a target device.

Memory 212 can be used to store instructions to be executed by the controller 604 as well as input and/or output data associated with execution of the instructions. In particular, memory 212 contains instructions, conceptually illustrated as a group of modules described in greater detail below, that control the operation of controller 604 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An apparatus for obtaining token information with a visible response, the apparatus comprising:
   a housing;
   reader circuitry for wirelessly obtaining, from a customer during a transaction, information encoded on a token;
   an approval module;
   integral with the housing, at least one illumination device for providing illumination from the housing, the illumination having colors that are variable among and associated with customers; and
   driver circuitry for causing the at least one illumination device to illuminate (i) during normal operation in a stand-by color and (ii) upon approval by the approval module of a the transaction in a customer color, wherein the customer color was associated with the customer presenting the token prior to the transaction and is different from the stand-by color.

2. The apparatus of claim 1, wherein the approval module comprises transceiver circuitry for (i) transmitting the obtained information to a data center and (ii) receiving approval information from the data center.

3. The apparatus of claim 1, wherein the approval module is configured to approve the token upon successful decryption thereof.

4. The apparatus of claim 1, wherein the driver circuitry causes the at least one illumination device to output the customer color at a higher luminous intensity than the stand-by color.

5. The apparatus of claim 2, wherein the customer color is identified by the approval information received by the transceiver circuitry.

6. The apparatus of claim 1, wherein the customer color is identified by the information encoded on the token.

7. The apparatus of claim 1, further comprising a memory, coupled to the driver circuitry, for storing an entered code specifying the stand-by color.

8. The apparatus of claim 1, wherein the driver circuitry is configured to:
   drive the at least one illumination device to output the stand-by color at a luminous intensity that varies rhythmically; and
   drive the at least one illumination device to output the customer color without luminous intensity variation.

9. The apparatus of claim 1, wherein the reader circuitry comprises an optical sensor.

10. The apparatus of claim 1, wherein the reader circuitry comprises a near-field communication sensor.

11. The apparatus of claim 1, wherein the at least one illumination device comprises a light ring surrounding at least a portion of the housing.

12. A method for obtaining token information with a visible response using a scanner device having a housing, the method comprising the steps of:
   in a stand-by mode, providing illumination from the housing in a stand-by color;
   wirelessly obtaining from a customer, by the scanner device, information encoded on a token;
   approving a transaction based on the token; and
   transitioning to an approval mode whereby the provided illumination changes to a customer color associated, prior to the transaction, with the customer presenting the token and which is different from the stand-by color.

13. The method of claim 12, further comprising the steps of:
   transmitting, by the scanner device, the obtained information to a data center; and receiving, by the scanner device, approval information from the data center.

14. The method of claim 12, wherein illumination in the stand-by mode has a lower luminous intensity than illumination in the customer color.

15. The method of claim 14, wherein the customer color is identified by the approval information.

16. The method of claim 12, wherein the customer color is identified by the information encoded on the token.

17. The method of claim 12, further comprising (i) receiving and storing a color code, and (ii) in the stand-by mode, causing the provided illumination to correspond to the stored color code.

18. The method of claim 12, further comprising the steps of:
   in the stand-by mode, rhythmically increasing and decreasing at a luminous intensity of the stand-by color; and
   in the approval mode, outputting the customer color without luminous intensity variation.

19. The method of claim 12, wherein the information encoded on the token is obtained optically.

20. The method of claim 12, wherein the information encoded on the token is obtained by near-field communication.

21. The method of claim 12, wherein the information encoded on the token is obtained by swiping a card through the housing.

22. The method of claim 12, wherein at least a portion of the provided illumination is output from a light ring surrounding at least a portion of the housing.

* * * * *